United States Patent [19]

Paton et al.

[11] 4,274,776

[45] Jun. 23, 1981

[54] DEPRESSED CENTER SPINE PIGGYBACK/CONTAINER RAILCAR

[76] Inventors: H. Neil Paton, 2521 W. Montlake Pl., Seattle, Wash. 98112; John B. Skilling, 3000 Webster Point R., Seattle, Wash. 98005

[21] Appl. No.: 821,539

[22] Filed: Aug. 3, 1977

[51] Int. Cl.³ ............... B60P 3/06; B61D 3/16; B61D 17/00; B61F 3/08
[52] U.S. Cl. .................. 410/57; 105/199 CB; 105/218 A; 105/414; 105/416; 105/418; 105/419; 410/3
[58] Field of Search ............ 105/4 R, 199 CB, 199 R, 105/199 S, 218 A, 368 B, 368 R, 182 R, 224.1, 366 R, 414, 416, 418, 419; 410/56, 57, 3

[56] References Cited

U.S. PATENT DOCUMENTS

| 148,618 | 3/1874 | McCarthy | 105/224.1 |
|---|---|---|---|
| 1,526,410 | 2/1925 | Aspinwall | 105/218 A X |
| 2,250,988 | 7/1941 | Eksergian | 105/218 A X |
| 2,638,852 | 5/1953 | Bannen | 105/414 X |
| 2,971,478 | 2/1961 | Dilworth et al. | 105/416 X |
| 3,102,497 | 9/1963 | Candlin, Jr. et al. | 105/416 X |
| 3,102,646 | 9/1963 | Clejan | 105/368 B X |
| 3,151,575 | 10/1964 | Dickey et al. | 105/366 R X |
| 3,223,052 | 12/1965 | Gutridge et al. | 105/416 X |
| 3,238,899 | 3/1966 | Gutridge et al. | 105/368 B X |
| 3,509,829 | 5/1970 | Henriksson et al. | 105/4 R X |
| 3,835,789 | 9/1974 | Sinclair | 105/218 A |
| 3,912,343 | 10/1975 | Paton et al. | 105/199 CB X |
| 3,946,676 | 3/1976 | Mackaness et al. | 105/218 A X |
| 3,948,188 | 4/1976 | Zehnder | 105/218 A X |
| 3,961,582 | 6/1976 | Paton et al. | 105/4 R X |
| 3,961,584 | 6/1976 | Paton et al. | 105/182 R |

Primary Examiner—David M. Mitchell
Assistant Examiner—Howard Beltran
Attorney, Agent, or Firm—Dowrey & Cross

[57] ABSTRACT

The railcar includes a low profile skeletal frame having a depressed midsection with supporting surfaces extending therefrom and a four point truck suspension. Vertical loads are applied to the frame so that opposed bending moments are established with respect to one or both pairs of suspension load support points. The railcar is capable of transporting conventional trailers, semi-trailers or containers through existing tunnel clearances.

26 Claims, 10 Drawing Figures

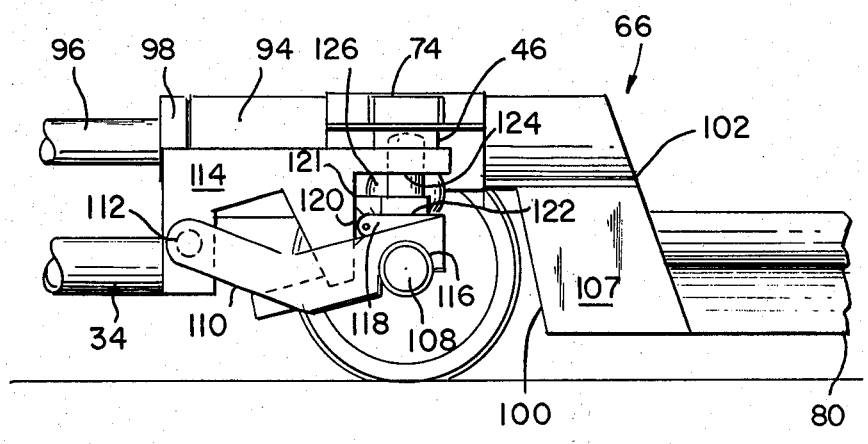
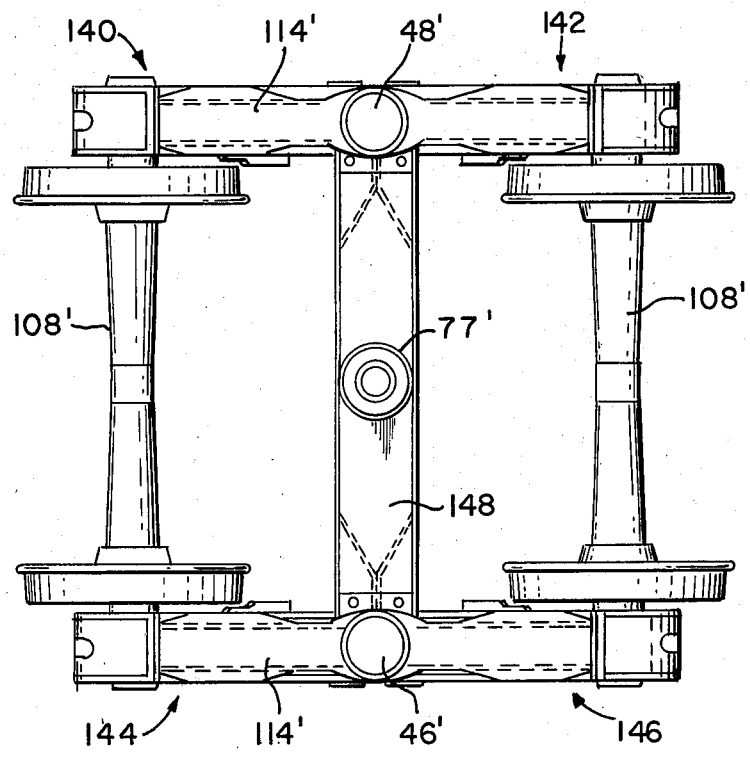
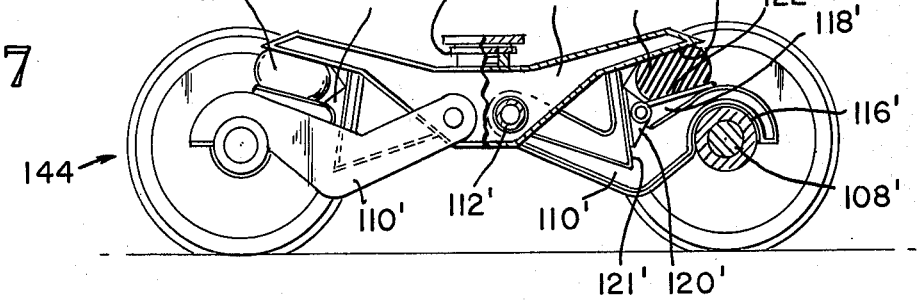

DEPRESSED CENTER SPINE PIGGYBACK/CONTAINER RAILCAR

BACKGROUND OF THE INVENTION

This invention relates to railcars. One application of the invention illustrated and described herein is a railcar suitable for intermodal or "piggyback" service in which a truck trailer is transported over long distances by railroad and then delivered locally at the end of the line by truck. This type of service also is referred to as trailer-on-flatcar (TOFC) service. The railcar of this invention, however, may be used to transport containers or other lading. Container service is referred to as container-on-flatcar (COFC) service.

TOFC rail service heretofore has not been extended to many areas in which existing tunnel and bridge clearances are insufficient to permit navigation of conventional 13 feet-6 inch high highway trailers. In the Northeast corridor of the United States in and around New York City, for example, maximum clearances correspond to the American Association of Railroads Clearance Plate "B", maximum vertical clearance being about 15 feet-6 inches and only 14 feet-8 inches for trailer-on-car widths of up to 8 feet-6 inches. Prior flatcars are unable to navigate conventional highway trailers through such clearances, even when equipped with special non-standard 28 inch wheels. Consequently, most TOFC traffic heretofore has been restricted to dedicated height clearance routing so that, as an example, virtually no freight between the Southern United States and the Northeast corridor is moved by TOFC service north of Washington, D.C. Most shippers in this area, therefore, send their goods the entire distance by truck, rather than convert from TOFC to highway service at some point during the trip. Similarly, such traffic destined for the New York City and New England areas from Chicago and the Midwestern area of the United States presently is unloaded in Northern New Jersey and trucked across the Hudson River by highway bridges to New York City, Long Island and up into the New England area. This preference for highway service produces undesirable energy waste, pollution, noise and excess traffic congestion in and around the areas affected. It further tends to increase freight rates and therefore produces an adverse economic impact upon those areas which discourages businesses from locating or remaining in those areas and encourages them to relocate elsewhere.

SUMMARY OF THE INVENTION

This invention provides a railcar suited for intermodal or "piggyback" service of both the TOFC and COFC types which is operable within existing tunnel and bridge clearances corresponding to the American Association of Railroads Clearance Plate "B" and larger. According to one preferred embodiment of this invention, conventional 13 feet-6 inch high highway trailers up to 8 feet-6 inches in width can be navigated through tunnels or bridges with overhead catenary and/or third rail electrification vertical clearances as low as about 15 feet-6 inches. The railcar includes a low profile frame, which preferably is of skeletal construction with a depressed midsection, and a four point truck suspension. The four points of suspension are arranged in two pairs adjacent the ends of the frame toward the intervening portion thereof in opposed transverse alignment with the longitudinal axis of the frame. Consequently, vertical loads applied to the frame at two or more locations spaced along the length of the frame can, by appropriate location, establish bending moments which oppose midspan deflection of the frame. For TOFC service associated with one semi-trailer, for example, the vertical load applied by the trailer wheels is supported intermediate the pairs of load support points while the vertical load applied by the free end of the trailer or king pin is applied at a location between one end of the frame and the respectively associated pair of load support points.

Thus, it will be appreciated from the foregoing summary that the weight of a railcar constructed according to this invention may be reduced by appropriate reduction in bending strength of the frame in accordance with the magnitude of the bending moment or moments established with respect to one or both pairs of load support points, as the case may be. The wheel base of the railcar according to this invention additionally is reduced by positioning the trucks in adjacent underlying relationship to the pairs of load support points, thereby minimizing or substantially eliminating lading damage due to vertical car-body flexure or accelerations. Reduced wheel base further enables the railcar to negotiate sharper curves than heretofore possible using conventional flatcars. Although both trucks preferably are of single axle articulated construction and are swivel mounted adjacent the pairs of load support points, respectively, one truck could be of fixed axle non-articulated construction, or the truck could be of suitable double axle construction, if desired.

The preferred depressed frame construction further enables conventional height trailers and semi-trailers to be navigated through minimum existing tunnel and bridge clearances. In one practical application of this invention, for example, empty 13 feet-6 inch high trailers up to 8 feet-6 inches in width may be transported at a total height above rail of only about 14 feet-8 inches and therefore may be navigated through tunnels and bridges of corresponding dimensions. This construction further provides an extremely low center of gravity which, in combination with the four point truck suspension described hereinabove, provides highly stable operation. This construction still further provides reduced wind resistance by situating the trailer in a more desirable aerodynamic position. It will be recognized that, in some applications incident to other than dedicated low clearance service, the frame construction may be modified by reducing or eliminating the depression of the intervening frame portion, thereby further reducing bending strength required and, hence, frame weight. For COFC service, since the container is not wheel-mounted, the frame could be flat from end to end and still satisfy even the most severe clearance requirements.

For these and other reasons, the railcar of this invention overcomes or substantially mitigates the problems associated with prior railcars for intermodal or "piggyback" service. Using the railcar of this invention, therefore, substantial economic and environmental benefits can be obtained. More specifically, the railcar of this invention appears capable of making a direct contribution to energy conservation through lower fuel costs obtained by weight reductions and aerodynamic improvements; contributing to the ecnomic condition of railroads through lower fuel costs and improved competitiveness with other modes of freight transportation;

allowing heavy freight loads to be shifted from highway traffic to rail traffic, thereby reducing highway congestion and associated pollution in and around major industrial areas, along with requirements for expensive highway repairs in future years; reducing freight tariffs and hence the cost of consumer goods and food in the areas presently affected by low tunnel and bridge clearances; and encouraging manufacturers and other industries to consider relocating or remaining located in such areas.

These and other features, objects and advantages of the invention will become apparent in the detailed description and claims to follow taken in conjunction with the accompanying drawings in which like parts bear like reference numerals.

BRIEF DESCRIPTION OF THE DRAWINGS

FIG. 5 is a side elevation taken along line 5—5 in FIG. 2;

FIG. 6 is a top plan view of a FIG. 1 double axle truck;

FIG. 7 is a side elevation of the FIG. 6 truck partially in section;

DETAILED DESCRIPTION OF THE DRAWINGS

Figure 1:
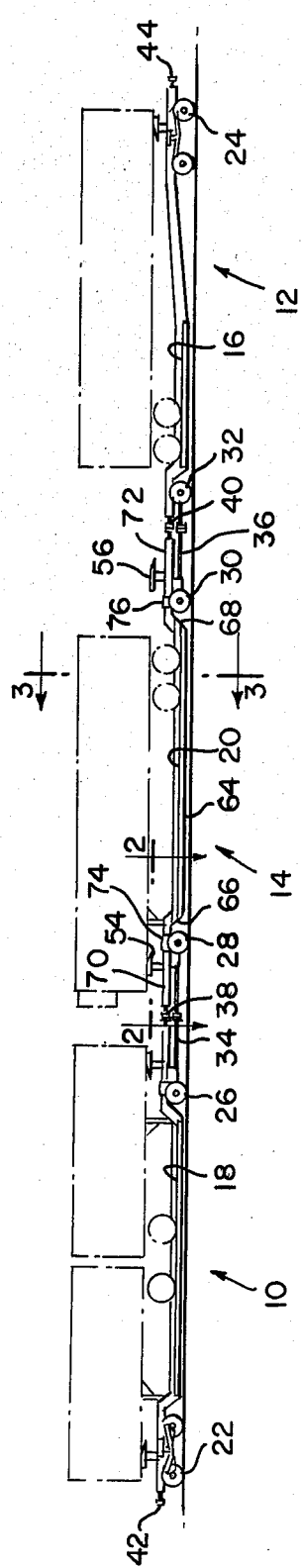
FIG. 1 is a side elevation of three railcars according to this invention.

FIG. 1 depicts a set of three interconnected railcars according to this invention. This set is made up of two end cars, 10 and 12, and an intermediate car 14. Although only one intermediate car is illustrated in FIG. 1, two, three or more intermediate cars generally similar to car 14 may be provided if desired. The FIG. 1 railcars may be utilized to provide intermodal, "piggyback" or TOFC service for conventional highway trailers or semi-trailers, or COFC service for conventional containers, through tunnel or bridge clearances at least corresponding to the American Association of Railroads Clearance Plate "B" (See FIG. 3). In the example, a standard 13 foot-6 inch high, 45 foot long highway semi-trailer; or two 13 foot-6 inch high, 27 foot long semi-trailers, with or without nose mounted refrigeration units, and up to 8 feet-6 inches in width, may be navigated through tunnel or bridge vertical clearances as low as about 15 feet-6 inches, without removal of and while supported by their customary highway running gear. In the example, car 10 is depicted as transporting two 27 foot semi-trailers, car 14 is depicted as transporting a single 45 foot semi-trailer with nose mounted refrigeration unit, and car 12 is depicted as transporting a 45 foot semi-trailer.

The three example cars illustrated in FIG. 1 each includes a low profile skeletal frame and a four point truck suspension. The frames are generally similar except that the wheel pans or load support surfaces of car 12 (one such surface referenced by numeral 16) are of reduced length. The load support surfaces of cars 10 and 14 extend substantially the entire length of the depressed intervening frame portions and are designated by reference numerals 18 and 20, respectively. The truck suspensions associated with the illustrated cars also are generally similar, except that the end cars 10, 12 are equipped with double axle trucks 22, 24 adjacent their outboard ends (left and right ends, respectively, as illustrated). The trucks associated with the inboard ends of cars 10 and 12, and with both ends of car 14, include single axles and are designated by reference numerals 26, 28, 30 and 32. The latter trucks can be interconnected by respective telescopic connectors 34, 36 to form two articulated double axle trucks—one such truck constituted by trucks 26 and 28, the other by trucks 30 and 32—as disclosed in U.S. Pat. No. 3,961,582. Adjacent inboard ends of cars 10, 12, 14 are respectively connected by conventional couplers or drawbars 38, 40, as shown (FIG. 1). The outboard ends of the two end cars 10, 12 are equipped with standard couplers 42, 44 located at conventional coupler height for operation with standard rolling stock. Two preferred trucks and associated suspensions are illustrated in FIGS. 5–11 and are described in further detail hereinafter.

Figure 2:
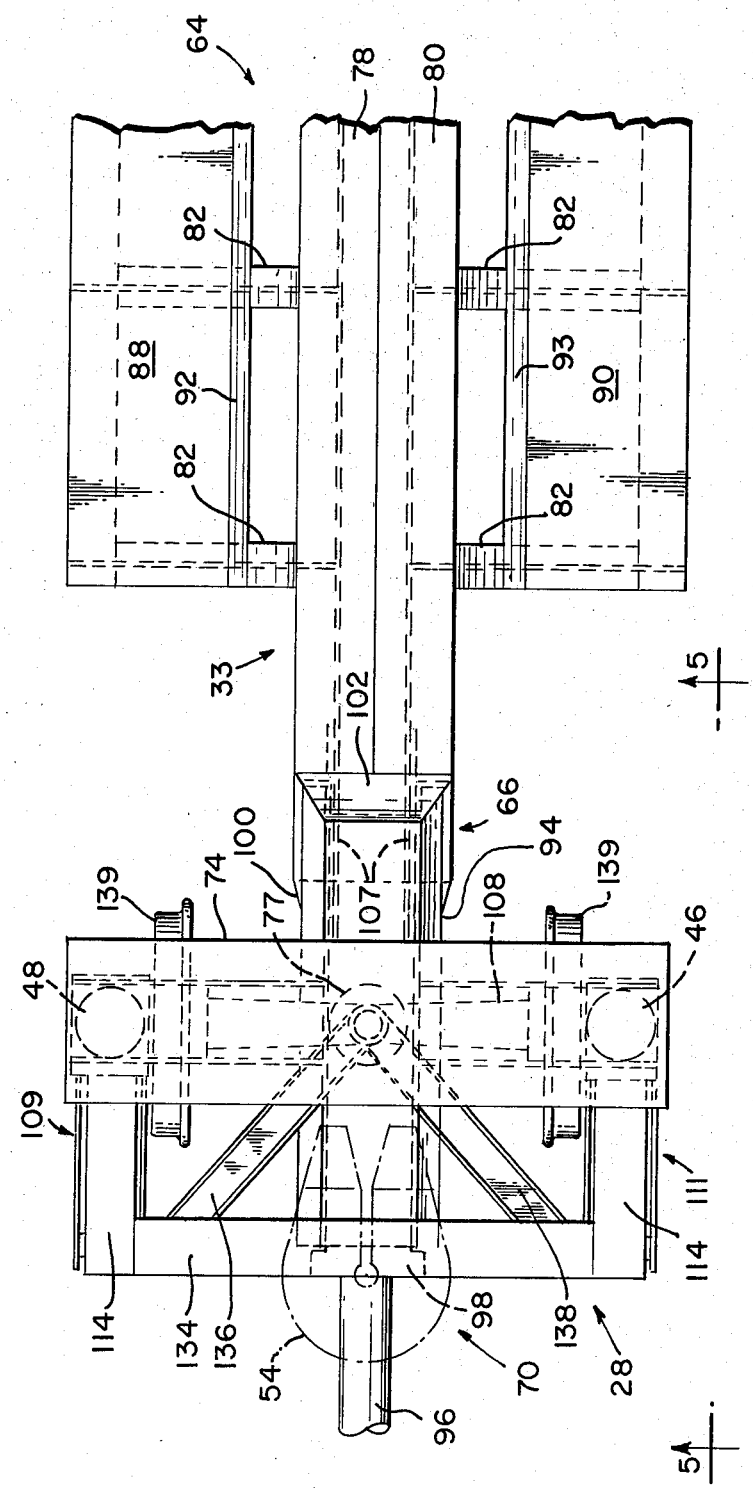
FIG. 2 is a fragmentary top plan view taken along line 2—2 in FIG. 1.

The four points of suspension associated with each illustrated car are arranged in identical patterns; hence, only the suspension points associated with car 14 are illustrated and described in detail hereinafter. The four point truck suspension associated with car 14 provides vertical load support at four vertical load support points located in pairs respectively spaced from the ends of the frame toward the depressed intervening portion thereof. Referring to FIG. 2, the load support points of each such pair are positioned in opposed transverse alignment with the longitudinal axis of the frame and respectively coincide with suitable constant contact side bearings 46 and 48. FIG. 2 illustrates the location of the two load support points adjacent the left end of car 14. The other two load support points associated with that car are positioned correspondingly adjacent its right end and respectively coincide with two additional side bearings not shown. A fifth wheel support 54 is mounted by the portion of the car frame between the load support points associated with the FIG. 2 side bearings 46, 48 and the adjacent end of the frame. To transport two semi-trailers mounted end-to-end as depicted in the FIG. 1 car 10, a second fifth wheel support 56 may be provided at a corresponding location adjacent the other end of the car. One side bearing suitable for use in the FIG. 1 railcars is disclosed in U.S. Pat. No. 3,912,343.

Figure 4:
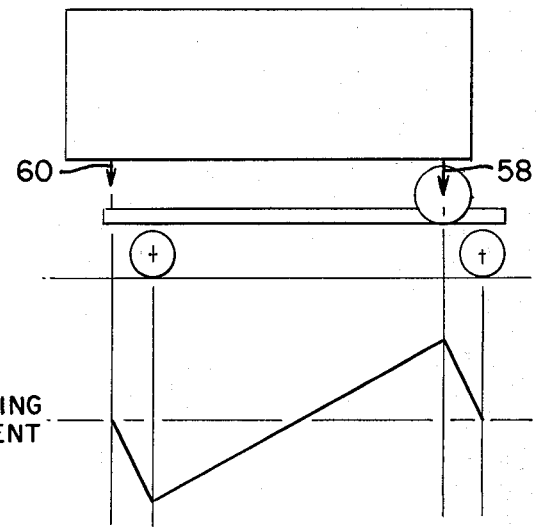
FIG. 4 is a bending moment diagram depicting loading conditions in a FIG. 1 railcar.

A typical bending moment diagram corresponding to the loading conditions established along the frame by one semi-trailer with respect to one pair of load support points is depicted in FIG. 4. This loading condition is established by supporting a first vertical load 58 at a predetermined position along the length of the frame between the pairs of load support points, thereby establishing a first bending moment with respect to one pair of load support points adjacent one end of the frame. An opposed bending moment is established by simultaneously supporting a second vertical load 60 at a predetermined position along the length of the frame between that one pair of load support points and the adjacent end of the frame. In the example, the first vertical load is applied by the trailer wheels and the second vertical load is applied by the trailer king pin. In the event two semi-trailers are transported simultaneously, as depicted with reference to car 10 of FIG. 1, of course, two sets of opposed bending moments are established.

Still referring to FIG. 4, it will be apparent that, by providing vertical load support and loading the frame at the locations indicated, it additionally is possible to reduce the beam span while maintaining the capability to transport highway trailers of conventional lengths with variable position sliders. This is, by using the illustrated construction, the bending strength which the frame must possess in order to support a highway trailer of a certain weight is less than that which would be required to support the same trailer over a longer beam span. Consequently, the unloaded weight of a railcar constructed according to this invention will be substantially less than the weight of prior railcars of longer beam spans. In one practical TOFC application, for example, the unloaded weight of the railcar of this invention should be at least about 4,000 pounds less than the unloaded weight of a generally similar railcar of conventional beam span in which both trailer loads are applied between the suspension load support points. As will be appreciated, the illustrated construction further affords a reduced wheel base which tends to minimize lading damage by reducing vertical car-body flexure, accelerations, etc., and which allows the railcar to negotiate much sharper curves than heretofore possible with conventional flatcars.

The frame associated with car 14 will now be described in further detail with reference to FIG. 1. That frame includes an elongated load bearing spine (referenced generally by numeral 33 in FIG. 2) which extends the length of the car and includes portions 64, 66, 68, 70 and 72, as shown (FIG. 1). Appropriate load support or load transmission members project transversely from the spine. More specifically, inclined load transmitting transition sections 66, 68 transmit loads from depressed intervening portion 64 to respectively associated raised end portions 70, 72. Two transverse bolster members 74, 76 respectively mounted by portions 70, 72 terminate in overlying relation with the respectively associated pair of vertical load support points and transmit vertical loads thereat to the truck suspension. Horizontal loads are respectively transmitted by two center pin assemblies (not shown in FIG. 1) to trucks 28 and 30 adjacent their pivot points, which, in the example, are located in transverse alignment with the vertical load support points and coincide with the longitudinal axis of the frame. One bolster member 74, transition section 66, associated frame end portion, and center pin assembly 77 are illustrated in further detail in FIG. 2. The corresponding structure associated with the opposite end of the car is identical and is not further illustrated or described herein.

Figure 3:
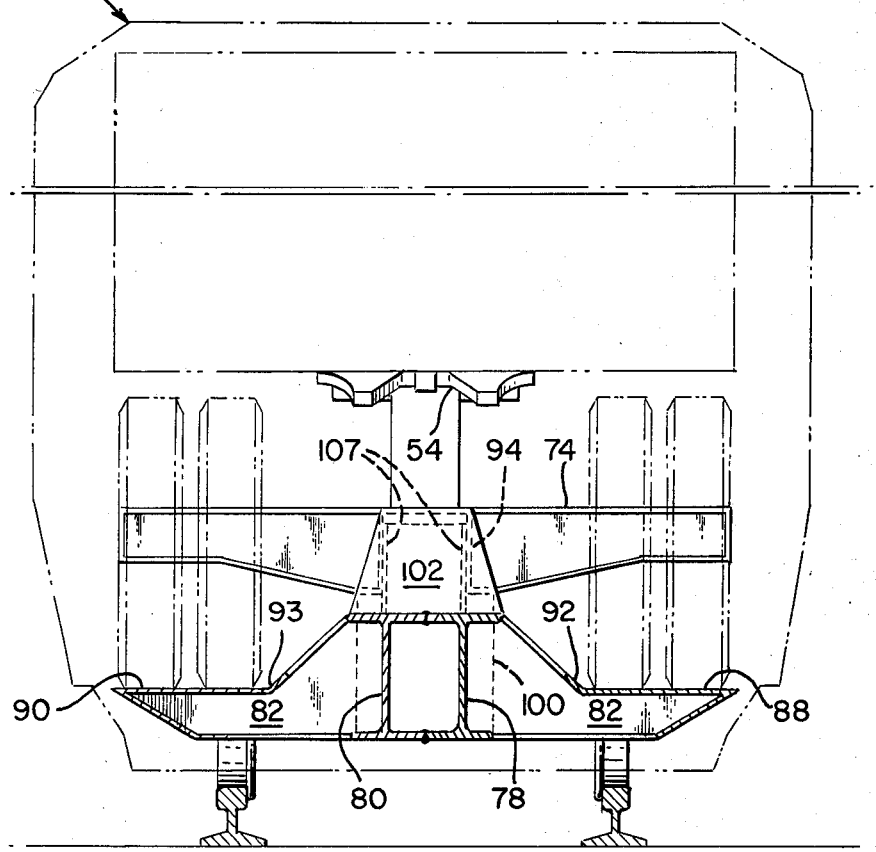
FIG. 3 is a section taken along the line 3—3 in FIG. 1.

In the examples of FIGS. 2 and 3, I-beam members 78, 80 constitute the principal mid-span load bearing spine structure associated with intervening portion 64. The upper and lower flanges of these members are rigidly secured together—in the example by welding—in coplanar horizontal alignment to form a box beam. A plurality of cantilever rib members 82 of I-beam construction and generally L-shaped outline project transversely outwardly from the outboard faces of the members 78, 80 at longitudinally spaced intervals in respective load bearing relation with coplanar wheel pans or load bearing surfaces 88, 90, as shown (FIG. 3). The wheel pans or load support surfaces 88, 90 extend substantially the entire length of the depressed portion of the FIG. 1 car 14 for providing load bearing support to the trailer wheels, as shown (FIG. 1). Two inclined inner surfaces 92, 93 are respectively upstanding from the inboard edges of the two load support surfaces at such transverse spacing that they can register with the wheels of the trailer, and extend a sufficient height above the load support surfaces that they additionally are engagable with portions of the trailer wheels. Preferably, these surfaces are spaced sufficiently apart that, with respect to most commercially used trailers and semitrailers, the inboard trailer wheels will be at close clearance therewith when resting on the load support surfaces, as shown (FIG. 3). Thus it is possible, by appropriate selection of spacing between the surfaces 92, 93, to restrain the trailer wheels against lateral shifting or sliding without extensive modifications to the railcar or trailer, and without use of cumbersome restraint and mounting devices for securing the trailer to the railcar during operation. In addition, the surfaces 92, 93 further act as guide surfaces for positioning the trailer wheels during loading by conventional loading apparatus.

The FIG. 2 raised portion is constituted by a flanged center sill 94 of generally inverted U-shaped cross section. A coupler or drawbar 96 along with a striker 98, both of conventional design, are mounted by one end portion of sill 94 and serve to transmit pushing and pulling forces between the adjacent cars. The other end of sill 94 is connected to and receives loads transmitted from the I-beam members 78, 80 by transition section 66 (FIG. 2). Section 66 includes two inclined parallel end members 100, 102 and two vertical side plates 107, as shown (FIGS. 2 and 3).

The illustrated frame construction as thus far described is of low profile. Consequently, in addition to lowering the loaded height of the trailer to the point that the trailer may be navigated through most existing tunnel clearances, the frame construction of this invention further provides a low center of gravity for the unloaded railcar and for the loaded railcar-trailer combination. The low center of gravity obtained, together with the four point suspension, tends to make the railcar of this invention, in both its loaded and unloaded conditions, extremely stable. Preferably, the load support surfaces 88 and 90 are between 10 inches and 1 foot-$7\frac{1}{2}$ inches, and most preferably about 1 foot-2 inches, from the tops of the rails. In this case, the center of gravity should be between 18 inches and 36 inches above the tops of the rails. These clearances, of course, may be varied, depending upon tunnel or overpass clearances, third rail clearances, and other factors.

To reduce unloaded car weight, the lengths of the wheel pans or load support surfaces may be reduced, depending upon the type of piggyback or container cargo being transported. The end car 12 illustrated in FIG. 1 includes wheel pans of reduced length and is suited principally for transporting long (e.g. 45 foot) semi-trailers, as shown. To transport shorter trailers or semi-trailers, of course, the wheel pans should extend substantially the entire length of the depressed frame portion, as depicted by the FIG. 1 cars 10 and 14 unless only one fifth wheel mount per car is used. To reduce unloaded weight even further, the eccentricity of the depressed portion of the car may be reduced or eliminated altogether, depending upon specific application. The bending strength which must be designed into the central frame, especially the depressed portion thereof, is directly related to the degree of eccentricity or the relative depression of the frame portion 64 with respect to its end portions 70, 72. Consequently, by reducing or eliminating this eccentricity so that the railcar approaches a flatcar configuration, it is possible to utilize a frame which possesses less bending strength. This, of course, allows the overall weight of the car to be reduced correspondingly. Modifications of this type could be utilized for other than dedicated low height and clearance service in connection with transportation of conventional trailers, semi-trailers, or containers. In the latter regard, appropriate container adapters may be mounted to the frame for supporting the ends of one or two containers. In this case, of course, it would be desirable to position the outboard container adapters as close as possible to the locations of the fifth wheel mounts illustrated in FIG. 1.

To reduce unloaded car weight still further, the transition sections 66, 68 could be eliminated by increasing the depths and, hence, web areas of beam members 78, 80 adjacent the ends thereof an amount sufficient to permit the beam flanges to be secured directly to the center sill flanges. Increasing the web area in this manner, of course, also reduces the flange area required to withstand an applied load and therefore affords a significant weight saving.

The single axle trucks referenced by numerals 26, 28, 30 and 32 in FIG. 1 are generally similar; and, therefore, only truck 28 is described hereinafter with specific reference to FIG. 5. The FIG. 5 truck includes two suspension assemblies (referenced by numerals 109 and 111 in FIG. 2) which respectively provide resilient frictionally damped load support between the two associated side bearings 46, 48 and the ends of the wheeled truck axle 108. Only one suspension assembly is illustrated in FIG. 5, the other being identical.

The FIG. 5 suspension assembly includes a load arm 110 which is pivotally secured at one end by, in the example, a rubber bused pivot 112 to a rigid side frame 114. The outer end of the load arm is connected via an elastomeric primary suspension pad 116 to the outboard end of the axle 108. A wedge 118 is mounted by the upper outer end surface of the arm 110. This wedge pivotally supports a friction shoe 120 which slidably bears against a friction surface 121 formed by the side frame. Wedge 118 additionally forms a generally horizontal surface 122 which is spaced vertically from and opposes a surface 124 formed by the side frame, as shown (FIG. 5).

Figure 8:
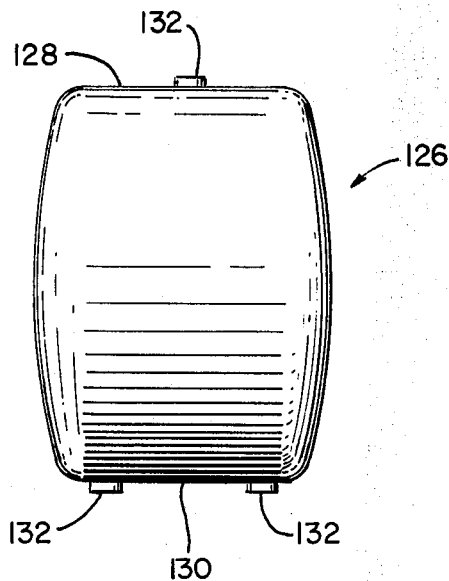
FIG. 8 is a side elevation of a rod spring suited for use in the FIG. 5 and/or FIG. 6 trucks.
Figure 9:
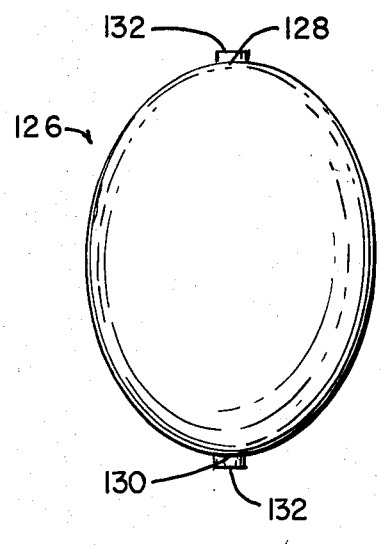
FIG. 9 is an end elevation of the FIG. 8 rod spring.

A rod spring (referenced by numeral 126 in FIG. 5) is positioned between and is loaded compressively by surfaces 122, 124 during movement of the load arm 110 with respect to the side frame. The rod spring, illustrated in further detail in FIGS. 8 and 9, is made up of an elongated solid body of elastomeric material having opposed elongated longitudinal load bearing surfaces 128 and 130 which respectively interface with surfaces 122 and 124. In the illustrated example, the rod spring is elliptical in cross section with its major axis intersecting surfaces 128, 130. It is illustrated in FIGS. 8, 9 in its unloaded condition, and in FIG. 5 in its loaded condition. The rod spring, of course, could be formed with other cross sections, for example a circular cross section as disclosed in the aforementioned U.S. Pat. Nos. 3,961,582 and 3,961,584.

In the FIG. 5 truck, the rod spring produces a variable rate spring force. It is compressed or squeezed between surfaces 122, 124 in a direction transverse to its longitudinal axis during upward movement of arm 110 with respect to the side frame. The non-loaded curved side and end surfaces of the rod spring, however, are allowed to bulge freely during compression loading, while sliding movement of the rod spring with respect to surfaces 122, 124 is prevented by appropriate shaping of surfaces 122, 124, provision of upper and/or lower mating positioning bosses 132 (FIGS. 8, 9) or the like restraint.

The FIG. 5 damper simultaneously produces a variable rate damping force which, in the example, should increase at a rate which corresponds to the rate of increase of the spring force produced by the rod spring during compression loading thereof. The friction shoe 120 is forced by wedge 118 against surface 121 to yield a frictional damping force during such upward movement of the load arm 110. The angle of inclination of surface 121 should be sufficient to afford the desired rate of increase of the frictional damping force obtained. In the illustrated suspension, surface 121 may be so inclined that the damping force obtained during upward movement of the load arm is less than that obtained during downward movement thereof.

The single axle truck further includes a transverse beam 134 which connects the side frames 114 and maintains them in the illustrated parallel alignment. Two diagonal braces 136, 138 transmit lateral and braking loads from beam 134 to assembly 77. Standard 33 inch diameter wheels 139 may be used. The telescopic connector 34 (FIG. 5) maintains the axles of two adjacent FIG. 5 trucks in parallel alignment when negotiatin curved track, as disclosed in the aforementioned U.S. Pat. No. 3,961,582.

The double axle outboard end trucks referenced by numerals 22 and 24 in FIG. 1 are generally similar; and therefore, only one is described hereinafter with reference to FIGS. 6 and 7. The FIGS. 6 and 7 truck includes four suspension assemblies 140, 142, 144, 146—two associated with each vertical load support point or side bearing, as shown (FIG. 6). Each of these suspension assemblies is similar to the FIG. 5 assembly; therefore, corresponding parts are not further described herein and are designated with the same reference numerals, primed.

As illustrated in FIG. 6, the double axle truck further includes a single transverse member 148 which, in the example, is huck bolted to side frames 114'. This member mounts the center pin assembly 77' and therefore carries horizontal loads and distributes them between the side frames. Member 148 further is torsionally flexible to permit the side frames 114' to rock relatively in respective vertical planes about its longitudinal axis, as illustrated and described in further detail in the aforementioned U.S. Pat. No. 3,961,584.

Figure 10:
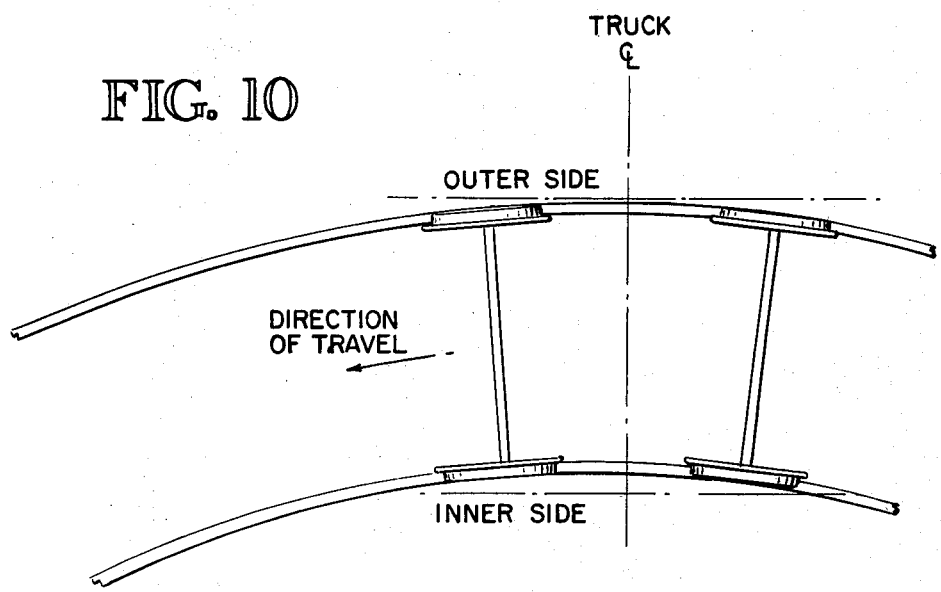
FIG. 10 is a schematic diagram depicting operation of the FIG. 5 and FIG. 6 trucks.

The double axle truck of FIGS. 6 and 7, as well as the articulated truck formed by two of the FIG. 5 trucks, offers self-steering characteristics when negotiating curved track. Referring to FIG. 10, the two outer load arms tend to spread the outer ends of the truck axles apart due to increased vertical loading at the outer load support point in response to centrifugal force. At the same time, the two inner load arms tend to draw the inner ends of the truck axles together due to correspondingly decreased vertical loading at the inner load support points, as indicated schematically in FIG. 10. Consequently, the truck axles are urged toward radial positions with respect to the center of curvature of the track curve. In one practical application, for example, the FIG. 6 truck axles should coincide with 4900 foot radii at 60 mph on a super-elevated 1900 foot curve.

Among the advantages of the truck suspension illustrated in FIGS. 5-11 are: inherent stability; reduction or substantial minimization of the effects of so-called "rock and roll;" reduction or substantial minimization of truck hunting; reduction in unsprung weight; ability to accept poor track conditions, including track twist; reduction or substantial minimization of truck/wheel shocks to the railcar and lading; elimination of spring bottoming and spring breakage; less wheel flange and rail wear by self-steering; optimum ride quality at relatively high speeds; and load deflectable damping which is self-adjusting for wear.

Although one preferred embodiment of the invention has been illustrated and described herein, variations will become apparent to one of ordinary skill in the art. For example, fixed single axle trucks could be substituted for trucks 26, 28, 30 and/or 32 illustrated in FIG. 1, as could other conventional swivel mounted single axle trucks. Likewise, conventional double axle trucks could be substituted for trucks 22 and/or 24 of FIG. 1. Additionally, a conventional two point truck suspension with center bowl vertical load support and intermittent contact side bearings could be used. Accordingly, the invention is not to be limited to the specific embodiment illustrated and described herein, and the true scope and spirit of the invention are to be determined by reference to the appended claims.

The embodiments of the invention in which an exclusive property or privilege is claimed are defined as follows:

1. A railcar, comprising:
a frame; and
a four point truck suspension operatively associated with said frame;
said frame including:
a spine, having a depressed center portion vertical load transmitting means projecting transversely from said spine adjacent both ends thereof for transmitting only vertical loads to said truck suspension at four vertical load support points, the load support points of each said pair being spaced apart in opposed transverse alignment with the longitudinal axis of said spine and constituting the sole load transmitting means projecting transversely from said spine adjacent both said ends, said depressed portion of the spine being located between said vertical load transmitting means;
first means for supporting a vertical load projecting from the depressed portion of said spine between said pairs, said means being adapted to support said load substantially at the level of said depressed portion, and
second means for supporting a vertical load projecting from said spine between one said pair and the adjacent end of said spine, whereby simultaneous vertical loads on said first and second vertical load support means establish opposed bending moments in said frame.

2. The railcar of claim 1 further comprising:
third means for supporting a vertical load projecting transversely from the depressed portion of said spine and substantially at the level of said depressed portion, and
fourth means for supporting a vertical load projecting from said spine between said other pair and the adjacent end of said spine, whereby simultaneous vertical loads on said third and fourth vertical load support means establish opposed bending moments in said spine.

3. The railcar of claim 1, wherein said first vertical load support means and said third vertical load support means include means operatively associated with said depressed portion for establishing two transversely spaced load support surfaces extending substantially the entire length of the depressed portion of said spine.

4. The railcar of claim 1, wherein said first vertical load support means further include cantilever mounting means projecting transversely outwardly from said depressed portion at longitudinally spaced intervals in underlying load bearing relationship to said support surfaces for maintaining said load support surfaces in a common plane adjacent the lower outboard edges of said depressed portion.

5. The railcar of claim 4, further comprising two inner surfaces respectively extending from said two load support surfaces, said two inner surfaces engageable with the wheels of a vehicle supported by said two load support surfaces for restraining the vehicle wheels against lateral movement.

6. The railcar of claim 4, wherein said spine includes two parallel beam members connected together to form a single box beam which comprises said depressed portion, said cant lever mounting means projecting transversely outwardly from the outboard faces of said box beam.

7. The railcar of claim 6, wherein said spine further includes two center sills respectively operatively connected with the ends of said box beam, said means for transmitting vertical loads to said truck suspension including two bolster members respectively mounted by said two center sills.

8. The railcar of claim 1, wherein said suspension includes one swivelable truck.

9. The railcar of claim 8, wherein said one truck includes a single axle, and means connectable to a single axle truck associated with an adjacent railcar for maintaining their axles in parallel alignment while permitting relative longitudinal movement thereof when negotiating curved track, and further comprising means connectable between the end of the frame associated with said one truck and the end of the frame associated with the adjacent truck for transmitting pushing and pulling forces therebetween.

10. The railcar of claim 9, wherein said means acting between said one truck and the adjacent truck are further operable to permit said one truck and the adjacent truck to rock relatively about a longitudinal axis therebetween.

11. The railcar of claim 8, wherein said one truck includes two axles, two side frames operatively connected to said axles, and means including a torsionally flexible transverse member for maintaining said side frames parallel while permitting them to swing relatively in respective vertical planes about the longitudinal axis of said member.

12. The railcar of claim 8, wherein said frame further includes means for transmitting a horizontal load to said one truck adjacent the swivel point thereof.

13. The railcar of claim 1, wherein said suspension includes two swivelable trucks.

14. The railcar of claim 13, wherein said two trucks each includes a single axle, and means connectable to a single axle truck associated with an adjacent railcar for maintaining their axles in parallel alignment while permitting relative longitudinal movement thereof when negotiating curved track, and further comprising means respectively connectable between the ends of the frame associated with said two trucks and the ends of the frames associated with the adjacent trucks for transmitting pushing and pulling forces therebetween.

15. The railcar of claim 14, wherein said means acting between said trucks and the adjacent trucks are further operable to permit said two trucks and the adjacent trucks to rock relatively about respective longitudinal axes therebetween.

16. The railcar of claim 15, wherein said frame further includes means for respectively transmitting horizontal forces to said trucks adjacent the swivel points thereof.

17. A railcar, comprising:
   a load support frame including a spine extending substantially the length of said railcar and having a depressed center portion;
   a four point truck suspension connected with said load support frame;
   vertical load transmitting means adjacent both ends of said spine for transmitting only vertical loads to said four point truck suspension at four vertical load support points, the load support points of each said pair being spaced apart in opposed transverse alignment with the longitudinal axis of said spine and constituting the sole load transmitting means projecting transversely from said spine adjacent both ends, said depressed portion of the spine being located between said vertical load transmitting means;
   first means for supporting a vertical load extending outwardly from the depressed portion of said spine and positioned substantially at the level thereof; and
   second means for supporting a vertical load on said spine, whereby simultaneous vertical loads on said first and second vertical load support means establish opposed bending moments in said spine.

18. The railcar according to claim 17, further comprising third means for supporting a vertical load on said load support frame between said second vertical load support means and the other said pair, and fourth means for supporting a vertical load on said load support frame between said other pair and the adjacent end of said load support frame, whereby simultaneous vertical loads on said third and fourth vertical load support means establish opposed bending moments in said load support frame.

19. The railcar frame according to claim 18, wherein said load support frame is depressed between said pairs.

20. A railway car, comprising:
   a load support frame including a spine extending substantially the entire length of the railcar and having a depressed center portion;
   a first truck pivotally mounted to said spine adjacent a first end thereof, said first truck having first and second vertical frame support points, said first and second vertical frame support points being on opposite sides of said spine, the first end of said spine projecting beyond the line defined by said first and second vertical frame support points;
   a first bolster mounted on said spine in vertical alignment with said first and second vertical frame support points;
   means for transmitting only vertical loads between said first bolster and said first and second vertical frame support points;
   a second truck pivotally mounted to said spine adjacent the second end thereof, said second truck having third and fourth vertical frame support points, said third and fourth vertical frame support points being on opposite sides of said spine, the second end of said spine projecting beyond the line defined by said first and second vertical frame support points;
   a second bolster mounted on said spine in vertical alignment with said third and fourth vertical frame support points;
   means for transmitting only vertical loads between said second bolster and said third and fourth vertical frame support points, said first and second bolsters constituting the sole load transmitting means projecting transversely from said spine adjacent both said ends, said depressed portion of the spine being located between said bolsters;
   first means for supporting a vertical load extending along a portion of the depressed portion of said spine substantially at the level thereof; and
   second means mounted between said first and second vertical frame support points and the first end of said load support frame for supporting a vertical load, whereby simultaneous vertical loads on said first and second vertical load support means establish opposed bending moments in said load support frame.

21. A railway car according to claim 20 wherein said load support frame has a depressed portion between said first and second trucks.

22. A railway car according to claim 20 wherein said means for transmitting vertical forces between said first bolster and said first and second vertical support points and said means for transmitting vertical forces between said second bolster and said third and fourth vertical frame support points comprise constant contact side bearings.

23. A railway car according to claim 20 or claim 22 wherein said first means for supporting a vertical load comprises:
   first and second load bearing surfaces extending substantially the length of the depressed portion of said load support frame for supporting the wheels of a vehicle; and
   first and second inner surfaces extending from said first and second load bearing surfaces, respectively, said first and second inner surfaces engageable with the wheels of a vehicle supported by said first and second load bearing surfaces for retaining the vehicle wheels against lateral movement.

24. A railway car according to claim 23 wherein said second means for supporting a vertical load includes a fifth wheel support for supporting one end of a semi-trailer.

25. A railway car according to claim 24 including a second fifth wheel support mounted between said second truck and the second end of said load support frame, whereby simultaneous vertical loads on said first and second fifth wheel supports establish opposed bending moments in said spine.

26. A railway car according to claim 25 further comprising:
   a first center pin assembly for mounting said first truck to said load support frame and for transmitting horizontal loads thereto; and
   a second center pin assembly for mounting said second truck to said load support frame and transmitting horizontal loads thereto.

* * * * *